United States Patent [19]

Kwiatek et al.

[11] Patent Number: 5,221,579
[45] Date of Patent: Jun. 22, 1993

[54] METHOD OF FORMING AND PROCESSING CONDUCTIVE POLYMER COMPOSITES

[75] Inventors: Jack Kwiatek, Cincinnati, Ohio; Vu A. Dang, Wilmington, Del.

[73] Assignee: Quantum Chemical Corporation, New York, N.Y.

[21] Appl. No.: 592,353

[22] Filed: Oct. 3, 1990

[51] Int. Cl.[5] .............................................. B32B 5/16
[52] U.S. Cl. ..................................... 428/403; 252/518
[58] Field of Search ......................... 428/403; 252/518

[56] References Cited

U.S. PATENT DOCUMENTS

| | | | |
|---|---|---|---|
| 3,418,265 | 12/1968 | McClain | 260/29.6 |
| 3,422,049 | 1/1969 | McClain | 260/29.6 |
| 4,532,188 | 7/1985 | Naarmann | 428/543 |
| 4,604,427 | 8/1986 | Roberts et al. | 428/395 |
| 4,818,607 | 4/1989 | Rickborn et al. | 428/403 |
| 4,874,735 | 10/1989 | O'Brien et al. | 502/159 |
| 4,880,508 | 11/1989 | Aldissi | 204/59 R |
| 4,937,060 | 6/1990 | Kathirgamanathan | 428/403 |

FOREIGN PATENT DOCUMENTS 61-11325  5/1986  Japan .

OTHER PUBLICATIONS

A. Yassar et al: Polym. Commun. 28, (4) 103 (1982).
R. V. Gregory et al: Abstracts, International Conference on Synthetic Metals, Santa Fe, N.M. (1988).

*Primary Examiner*—Edith Buffalow
*Attorney, Agent, or Firm*—Wood, Herron & Evans

[57] ABSTRACT

A processable thermoplastic conductive composite resin is formed by coating polypyrrole onto the surface of microbeads by in situ oxidative polymerization. The microbeads, generally having an average diameter from about 0.5 to about 500 microns, are coated with polypyrrole by combining pyrrole, oxidizing agent and the beads in a protic solvent such as water, methanol, ethanol, ethylene glycol and the like. The pyrrole polymerizes on the surface of the microbeads. The microbeads, which are thermoplastic, can then be processed and the conductivity of the processed polymer remains high, generally about 0.1 to about 10 S/cm. This is suitable for use as a conductive film. By incorporating a sulfonate counterion, the conductivity of the composite is significantly improved. Further, by incorporating a heat activated cross-linking agent such as a peroxide, the tensile strength of the processed polymer is significantly improved.

12 Claims, 1 Drawing Sheet

POLYETHYLENE MICROBEAD / POLYPYRROLE FILM CONDUCTIVITIES

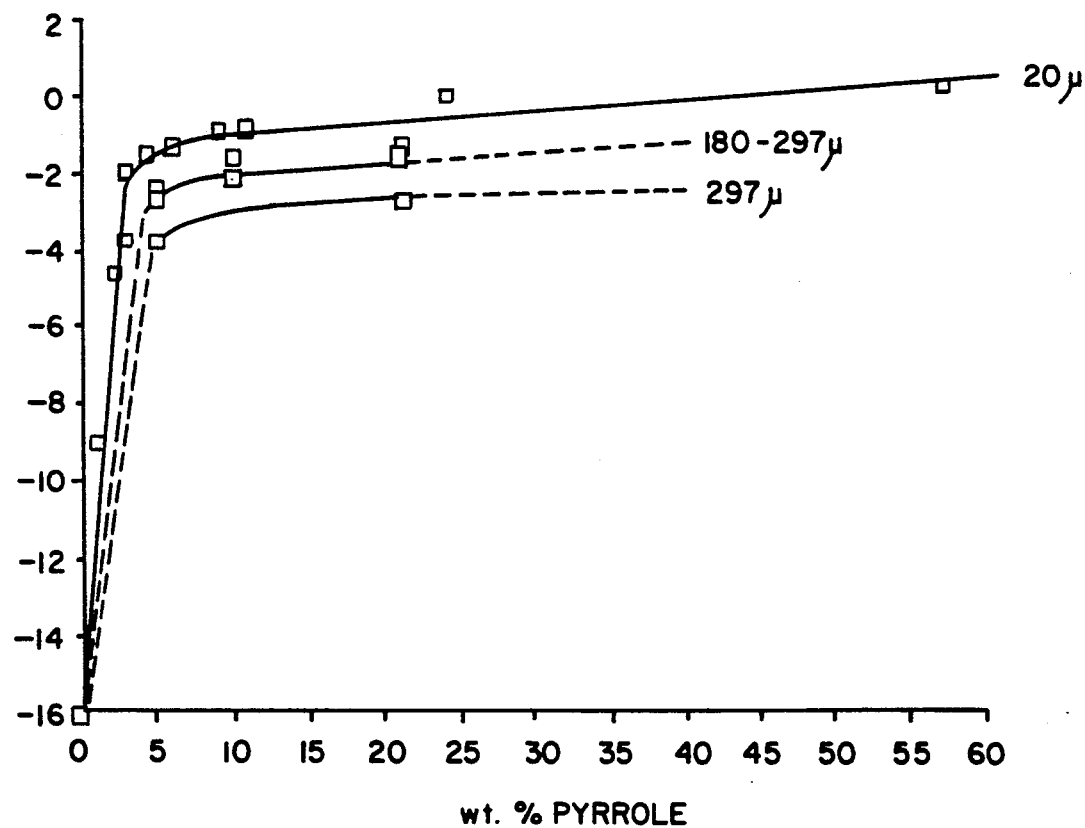

METHOD OF FORMING AND PROCESSING CONDUCTIVE POLYMER COMPOSITES

BACKGROUND

Substances which conduct electricity have been divided into two main classes. Those with conductivities of $10^{-9}$ to $10^2$ S/cm (S = Siemen = Ohm$^{-1}$ are called semiconductive or electroactive. Materials with conductivities of $10^2$ S/cm and higher are called conductive. A number of polymers exhibit conductivities in or approaching the latter range, particularly when doped with oxidizing or reducing agents. Examples of these are polyaniline, polypyrrole, polythiophene, and polyacetylene.

These polymers are potentially useful in batteries, as a lightweight replacement for metal wire, and in antistatic applications as well as in shielding from radio frequencies and electromagnetism.

Polypyrrole has a conductivity of $10^2$ S/cm. This polymer unfortunately has the disadvantage of being extremely brittle, and is generally considered to be unprocessable. Therefore, it has limited utility. It has been disclosed that polypyrrole can be coated onto textiles to provide conductive textiles. (R. V. Gregory, W. C. Kimbrell and H. H. Kuhn, Abstracts, International Conference on Synthetic Metals, Santa Fe, New Mexico (1988)). Of course textile films generally cannot be processed, for example, by extrusion. Polypyrrole has also been coated onto submicronic latex particles. (A. Yassar, J. Roncali and F. Garnier, Polym. Commun., 28, 103 (1987)). The conductivity of films formed from these products is relatively low reaching no higher than 0.25 S/cm.

Japanese Kokai 61-111325 discloses polymer particles coated with in situ formed conductive polymers such as polypyrrole, polyaniline, and polythiophene. These composites, which contain relatively high percentages (38–60 wt. %) of the conductive polymer are relatively brittle and unsuitable for most applications. Further, this reference fails to make any disclosure of particle size or shape.

SUMMARY OF THE INVENTION

The present invention is premised upon the realization that a relatively flexible conductive polymer film can be formed from composites made by polymerizing pyrrole onto the surface of thermoplastic polymer microbeads provided the concentration of the polypyrrole is controlled along with the shape and particle size of the microbeads.

More particularly, the present invention is premised upon the realization that generally spherical thermoplastic polymer microbeads, having an average particle size of from about 0.5 to about 500 microns, and coated with from about 3% to about 30% polypyrrole, form polymeric composite materials which can be processed into relatively flexible polymeric films, strands and other shapes with conductivities approaching that of certain metals, and generally acceptable tensile strength and other physical characteristics.

Further, the present invention is premised on the realization that losses of tensile strength in these films caused by incorporation of polypyrrole in the thermoplastic polymer can be avoided. Specifically, the microbeads can include a heat activatable cross-linking agent. Thus, when the beads are processed at elevated temperatures, the cross-linking agent cures the formed material and the tensile strength remains high.

Further, by including appropriate doping agents, the conductivity of the formed composite polymer can be increased.

The objects and advantages of the present invention will be further appreciated in light of the following detailed description and drawings in which:

BRIEF DESCRIPTION OF DRAWING

The figure is a graph showing the relative effect of polypyrrole loading on conductivity with particles of various diameters.

DETAILED DESCRIPTION

According to the present invention, thermoplastic microbeads are coated with a conductive film of polypyrrole. The coating is applied by the in situ polymerization of pyrrole in the presence of the microbeads.

For purposes of the present invention, pyrrole is defined to include pyrrole as well as 3-alkyl substituted pyrrole such as 3-alkyl pyrrole wherein the alkyl group may be $C_1$–$C_5$ alkyl. The formed polypyrrole polymer would have the following general formula:

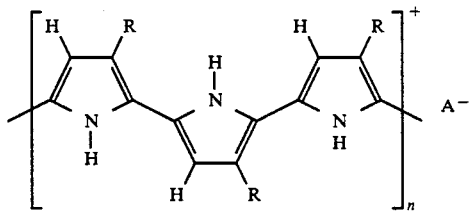

wherein R represents a moiety selected from the group consisting of H and $C_1$–$C_5$ alkyl. A represents a counterion or a mixture of counterions and generally will represent chloride, sulfate, aryl or alkyl sulfonate, nitrate, fluoroborate, perchlorate and the like.

The thermoplastic microbead will be substantially spherical. The diameter of the microbead should range from about 0.5 to about 500 microns with 2–200 microns being preferred and 5 to 50 microns being most preferred. The continuous curved surface of the spherical microbeads improves the physical properties of the formed composite beads.

The chemical composition of microbeads will vary. The microbead must be formed from a thermoplastic material which would permit further processing to form films, strands, molded parts and the like. Further, the material must be one which, under oxidative conditions, will not be broken down. Specifically suitable microbeads include those formed from polyethylene, polypropylene, ethylene-N-butylacrylate copolymer, polyamides (nylons), ethylene-vinyl acetate copolymer, and ethylene-vinyl alcohol copolymer.

Suitable microbeads can be purchased from Quantum Chemical under the trademark "Microthene." The process of making thermoplastic microbeads is disclosed in U.S. Pat. Nos. 3,481,265 and 3,422,029, the disclosure of which are incorporated herein by reference.

The microbeads are coated with polypyrrole formed by pyrrole polymerized in solution onto the surface of the microbead. The preferred solvent is a protic solvent, preferably one which has at least one hydroxyl group. Suitable solvents include $C_1$–$C_8$ alcohols, $C_2$–$C_5$ glycols such as ethylene glycol, and water. Specific alcohols include methanol, ethanol, octanol, and pentanol. Other solvents which will function, but are less preferred, include THF, benzene, chloroform, and acetonitrile.

The reaction is conducted by combining the pyrrole monomer, the microbeads, and an oxidizing agent in the solvent. For purposes of the present invention, suitable oxidizing agents include ferric chloride, sulfuric acid, cupric chloride, quinones such as benzoquinone and ammonium persulfate.

The oxidative polymerization requires a minimum of two oxidation equivalents per pyrrole; 2–2.5 equivalents are preferred. The reaction is generally conducted at atmospheric pressure and at temperatures from about 0° C. to about 100° C. with ambient temperature being preferred. The reaction time may vary from about 1 hour to about 50 hours, and is complete when all pyrrole has been polymerized.

If the oxidizing agent is ferric chloride, the counterion A in the above formula will be chloride. However, if a suitable dopant is added, this can partially displace the chloride counterion. For example, sulfonate ions can be used to replace the chloride counterions by adding an alkali metal salt of a sulfonic acid to the reaction mixture. Such aromatic sulfonates include 2-naphthalene sulfonate (2-NMS), p-tolyl sulfonate (p-TS), 2,6-naphthalene disulfonate (2,6-NDS), 1,5-naphthalene disulfonate (1,5-NDS), 1,3,6-naphthalene trisulfonate (NTS), and the aliphatic n-octyl, n-butyl, and polyvinyl sulfonates. The molar ratio of sulfonate counterion to pyrrole should be from 1 to about 2.5.

It is important to maintain the percentage of the polypyrrole relative to the combined mass of the polypyrrole and the microbead to within defined limits. If too little polypyrrole is formed, the microbead will not be suitable for formation of a conductive film. If too much polypyrrole is present, the formed composite will be unprocessable, being too brittle for use as a film. Generally, the percentage by mass of polypyrrole relative to that of the polypyrrole coated bead should be from about 3% to about 30% with about 5% to 25% being preferred.

The concentration of the polypyrrole coating is controlled by varying the pyrrole to microbead mass ratio in the polymerization solution. Generally, the mass ratio of pyrrole to microbead should be from about 3 to about 20% with about 5–15% being preferred. The total mass of the polypyrrole is significantly influenced by its associated counterion.

The mechanical characteristics of the formed microbeads can be improved by incorporating a cross-linking agent in the microbead. For example, peroxides such as dicumyl peroxide can be incorporated into ethylene based microbeads by mixing the solid uncoated microbeads with the dicumyl peroxide at a temperature of about 100° F. Approximately 0.5 to about 2 weight percent dicumyl peroxide supplies sufficient cross-linking agent to the polyethylene so that under processing conditions, the peroxide will cause cross-linking.

The polypyrrole coated microbeads of the present invention may be processed at elevated temperature and under pressure to form, for example, conductive films, coatings and the like. The temperature and pressure conditions for the processing will vary depending on the microbead chosen. Generally the temperature will be less than about 250° C. and generally from about 100° C. to about 200° C. for all polymers formed and the pressure may be from about 1000 psi to about 5000 psi.

The conductivity of films formed from polypyrrole coated microbeads wherein the concentration of the polypyrrole is varied levels out at about 20 to 25% polypyrrole. Therefore, there is no need to increase the concentration above about 30%. This simply adds to the cost and impairs the physical characteristics of the polymer components.

The formation of polypyrrole microbeads and the processing thereof will be further appreciated in light of the following detailed examples.

EXAMPLE 1

Pyrrole (5–15 weight percent of Microthene) was added to an aqueous dispersion of Microthene (30g in 1 l). Aqueous ferric chloride (molar Fe/pyrrole ratio = 2.3) was added and the mixture was tumbled on a roller mill for 18–24 hours. The resultant black solids were suction-filtered, washed with water, methanol, acetone and vacuum-dried.

EXAMPLE 2

A solution of pyrrole (1.3 g), the disodium salt of 2,6-naphthalenedisulfonic acid (3.0 g) and ferric chloride hexahydrate (11.3 g) in water (1 L.), to which 30 g. of polyethylene microbeads (Microthene FA 750; less than 20 microns average diameter) were added, was placed in a glass jar which was then rotated for 24 hours at ambient temperature. The microbeads were removed by filtration, washed with water, then with acetone, and vacuum dried at 50° C.

A sample of the dry powder was pressed into a 10 mil thick film at 150° C. and 2500 psi. Conductivity of the film was 0.11 S/cm.

EXAMPLE 3

The same reaction as in Example 2 was carried out except that 4.0 g pyrrole, 10.0 g of the disulfonic acid salt and 33.0 g of the ferric chloride were used to obtain a heavier coating of polypyrrole on the Microthene ®FA 750.

A 1 mil thick film was formed from the polypyrrole coated beads at 150 . and 5000 psi. The film exhibited a conductivity of 1.7 S/cm.

EXAMPLE 4

Polypyrrole coated microbeads prepared using Microthene ®FE532 and various sulfonate counterions were pressed at 150° C., 5000 psi for 2 minutes unless noted otherwise. Film conductivities were determined using the four-probe method. Six measurements were taken in three different regions of the sample and the average is reported in Table 1.

The data illustrate the effects of polypyrrole coating thickness and film-forming pressure.

TABLE 1

| FILM PROPERTIES OF POLYPYRROLE-MICROTHENE ® FE 532 COMPOSITES | | | | | |
| --- | --- | --- | --- | --- | --- |
| Sulfonate Counterion | Pyrrole Loading | Peroxide | Film Cond. (S/cm) | Tensile (psi) | Elongation (%) |
| None | None | No | — | 1740 | 500 |
| 2-NMS | 5 | No | 0.03 | 1000 | 11 |
| 2-NMS | 9 | No | 1.2 | 1070 | 0 |
| p-Tolyl | 9 | No | 0.2 | 1200 | 8 |
| 2,6-NDS | 11 | No | 0.3 | 1050 | 0 |
| NTS | 15 | No | 0.5 | 1470 | 8 |
| DBS | 15 | No | 0.1 | 1100 | 11 |
| (Chloride) | 15 | No | 0.5 | 1500 | 8 |
| 2-NMS | 15 | Yes | 0.3 | 1560 | 8 |
| 2,6-NDS | 11 | Yes | 0.1 | 1600 | 10 |

EXAMPLE 5

The results of a number of experiments carried out in the same manner as Example 3, but varying both polyethylene bead size and the weight of polypyrrole loaded onto the beads, are shown in the figure.

It may be seen that for polyethylene composite films there is a polypyrrole loading threshold value of about 4 wt.%. This is the loading level below which conductivities drop rapidly to that of polyethylene itself and above which they gradually level out at about 2.5 S/cm. Conductivities were also found to be dependent on the size of the microbead particles used in the formation of the films. The smaller the size of the microbeads, the higher the conductivity reached at equivalent loading levels.

EXAMPLE 6

A mixture of dicumyl peroxide (0.9g) and Microthene FE532 (9% vinyl acetate, 60g) was tumbled under IR lamp overnight. Pyrrole (8g), FeCl$_3$ 6H$_2$O (66g), Pluronic F98 (0.3g), sodium 2,6-naphthalene disulfonate (20g), distilled water (2 l) then were added to the mixture. After another 20 hours tumbling on a roller, the reaction was stopped, filtered, washed (water, MeOH), and dried in a vacuum oven (50° C./4mm Hg). The resultant product containing 15% polypyrrole was pressed into a 0.019" thickness film. The film had good mechanical properties and exhibited a conductivity of 0.1S/cm.

The effect of peroxide cross-linking agent is further demonstrated by the mechanical properties set forth in Table 2.

TABLE 2
MECHANICAL PROPERTIES OF EVA-POLYPYRROLE COMPOSITES

| Samples | Yield Break | % Elong |
|---|---|---|
| without peroxide | 1050 psi<br>7.24 mpa | 0 |
| with peroxide<br>7% polypyrrole | 1630 psi<br>11.23 mpa | 40 |
| with peroxide<br>15% polypyrrole | 1620 psi<br>11.03 mpa | 15 |

The preceding has a description of the present invention along with the best mode of the invention currently known. However, the invention is defined only by the appended claims wherein we claim:

We claim:

1. A method of forming a conductive thermoplastic polymer blend suitable for forming a flexible conductor comprising coating the surface of thermoplastic microbeads having an average diameter of from about 0.5 to about 500 microns with from about 3% to about 30% polypyrrole by oxidative polymerization of pyrrole onto said surface of said thermoplastic microbeads.

2. The method claimed in claim 1 wherein the composition of said microbead is selected from the group consisting of polyethylene, polypropylene, ethylene vinyl alcohol copolymer, ethylene vinyl acetate copolymer, polyamide and ethylene-n-butylacrylate copolymer.

3. The method claimed in claim 1 further comprising thermoforming said microbeads to form a shaped flexible conductor.

4. The method claimed in claim 1 comprising polymerizing said pyrrole onto said microbeads wherein said polymerization is conducted in a solvent selected from the group consisting of water, ethanol, methanol, octanol, pentanol, and $C_2$–$C_5$ glycols.

5. The method claimed in claim 1 wherein said thermoplastic microbeads are generally spherical.

6. The method claimed in claim 4 wherein an effective amount of an aromatic sulfonate composition is dissolved in said solvent during said polymerization.

7. The method claimed in claim 1 wherein said concentration is from about 5% to about 20% polypyrrole.

8. The method claimed in claim 1 wherein said microbeads include a heat activated cross-linking agent.

9. The method claimed in claim 1 wherein said polymerization is conducted in the presence of an oxidant selected from the group consisting of ferric chloride, sulfuric acid, cupric chloride, benzoquinone and ammonium persulfate.

10. The method claimed in claim 9 wherein said oxidant is ferric chloride.

11. The method claimed in claim 1 wherein said microbeads have average diameter of 5–50 microns.

12. A method of forming a conductive thermoplastic polymer blend comprising polymerizing pyrrole under oxidative conditions onto the surface of a thermoplastic microbead center wherein the percentage of polypyrrole coated onto said microbead is from about 5 to about 20% based on the combined mass of said polypyrrole and said microbead center;

wherein said microbead center has an average diameter of from about 10 to about 300 microns wherein said polymerization is conducted under oxidative conditions in a solvent selected from the group consisting of water, ethanol, methanol, octanol, pentanol, and ethylene glycol;

wherein said pyrrole and is selected from the group consisting of pyrrole, three $C_1$–$C_5$ alkyl pyrrole;

wherein said polymerization is conducted in the presence of about 1 to about 2 molar equivalents of sulfonate counterion based on the molar concentration of pyrrole.

* * * * *